(12) United States Patent
Fleischmann et al.

(10) Patent No.: US 9,477,303 B2
(45) Date of Patent: Oct. 25, 2016

(54) SYSTEM AND METHOD FOR COMBINING THREE-DIMENSIONAL TRACKING WITH A THREE-DIMENSIONAL DISPLAY FOR A USER INTERFACE

(71) Applicant: Omek Interactive, Ltd., Bet Shemesh (IL)

(72) Inventors: Shahar Fleischmann, Hod Hasharon (IL); Gershom Kutliroff, Alon Shvut (IL); Yaron Yanai, Modiin (IL)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 13/857,009

(22) Filed: Apr. 4, 2013

(65) Prior Publication Data

US 2013/0265220 A1  Oct. 10, 2013

Related U.S. Application Data

(60) Provisional application No. 61/621,957, filed on Apr. 9, 2012.

(51) Int. Cl.
*G06F 3/01* (2006.01)

(52) U.S. Cl.
CPC ............... *G06F 3/011* (2013.01); *G06F 3/017* (2013.01)

(58) Field of Classification Search
None
See application file for complete search history.

(56) References Cited

U.S. PATENT DOCUMENTS

| | | |
|---|---|---|
| 4,900,033 A | 2/1990 | Campos et al. |
| 5,534,917 A | 7/1996 | MacDougall |
| 5,994,844 A | 11/1999 | Crawford et al. |
| 6,072,494 A | 6/2000 | Nguyen |
| 6,104,379 A | 8/2000 | Petrich et al. |
| 6,181,343 B1 | 1/2001 | Lyons |
| 6,256,033 B1 | 7/2001 | Nguyen |
| 6,270,414 B2 | 8/2001 | Roelofs |
| 6,336,891 B1 | 1/2002 | Fedrigon et al. |
| 6,632,158 B1 | 10/2003 | Nashner |
| 6,750,890 B1 | 6/2004 | Sugimoto |

(Continued)

FOREIGN PATENT DOCUMENTS

| | | |
|---|---|---|
| CN | 1656503 A | 8/2005 |
| CN | 101305401 A | 11/2008 |

(Continued)

OTHER PUBLICATIONS

Balakrishnan et al., "User Interfaces for Volumetric Displays", IEEE, 2001.*

(Continued)

*Primary Examiner* — Kee M Tung
*Assistant Examiner* — Nicholas R Wilson
(74) *Attorney, Agent, or Firm* — Blakely, Sokoloff, Taylor & Zafman LLP

(57) ABSTRACT

Systems and methods for combining three-dimensional tracking of a user's movements with a three-dimensional user interface display is described. A tracking module processes depth data of a user performing movements, for example, movements of the user's hand and fingers. The tracked movements are used to animate a representation of the hand and fingers, and the animated representation is displayed to the user using a three-dimensional display. Also displayed are one or more virtual objects with which the user can interact. In some embodiments, the interaction of the user with the virtual objects controls an electronic device.

19 Claims, 12 Drawing Sheets

(56) References Cited

U.S. PATENT DOCUMENTS

| | | |
|---|---|---|
| 6,788,809 B1 | 9/2004 | Grzeszczuk et al. |
| 6,941,239 B2 | 9/2005 | Unuma et al. |
| 7,027,083 B2 | 4/2006 | Kanade et al. |
| 7,038,855 B2 | 5/2006 | French et al. |
| 7,225,414 B1 | 5/2007 | Sharma et al. |
| 7,340,077 B2 | 3/2008 | Gokturk et al. |
| 7,369,685 B2 | 5/2008 | DeLean |
| 7,372,977 B2 | 5/2008 | Fujimura et al. |
| 7,379,563 B2 | 5/2008 | Shamaie |
| 7,421,369 B2 | 9/2008 | Clarkson |
| 7,538,744 B1 | 5/2009 | Liu et al. |
| 7,665,041 B2 | 2/2010 | Wilson et al. |
| 7,725,547 B2 | 5/2010 | Albertson et al. |
| 7,753,861 B1 | 7/2010 | Kahn et al. |
| 7,781,666 B2 | 8/2010 | Nishitani et al. |
| 7,789,800 B1 | 9/2010 | Watterson et al. |
| 7,815,507 B2 | 10/2010 | Parrott et al. |
| 7,840,031 B2 | 11/2010 | Albertson et al. |
| 7,843,425 B2 | 11/2010 | Lu et al. |
| 7,849,421 B2 | 12/2010 | Yoo et al. |
| 7,970,176 B2 | 6/2011 | Kutliroff et al. |
| 7,971,156 B2 | 6/2011 | Albertson et al. |
| 8,094,928 B2 | 1/2012 | Graepel et al. |
| 8,113,991 B2 | 2/2012 | Kutliroff |
| 8,228,315 B1 | 7/2012 | Starner et al. |
| 8,319,865 B2 | 11/2012 | Lee et al. |
| 8,686,943 B1 | 4/2014 | Rafii |
| 2001/0016510 A1 | 8/2001 | Ishikawa et al. |
| 2003/0025678 A1 | 2/2003 | Lee et al. |
| 2003/0078138 A1 | 4/2003 | Toyama |
| 2003/0113018 A1 | 6/2003 | Nefian et al. |
| 2003/0134714 A1 | 7/2003 | Oishi et al. |
| 2003/0156756 A1 | 8/2003 | Gokturk et al. |
| 2004/0001113 A1 | 1/2004 | Zipperer et al. |
| 2004/0136561 A1 | 7/2004 | Wang |
| 2004/0136564 A1 | 7/2004 | Roeber et al. |
| 2004/0190776 A1 | 9/2004 | Higaki et al. |
| 2005/0227811 A1 | 10/2005 | Shum et al. |
| 2005/0231532 A1* | 10/2005 | Suzuki et al. ................ 345/633 |
| 2005/0271279 A1 | 12/2005 | Fujimura et al. |
| 2006/0018516 A1 | 1/2006 | Masoud et al. |
| 2006/0044327 A1* | 3/2006 | Okuno ................ G06F 3/0304 |
| | | 345/626 |
| 2006/0202953 A1 | 9/2006 | Pryor et al. |
| 2006/0215011 A1 | 9/2006 | P. S. et al. |
| 2007/0110298 A1 | 5/2007 | Graepel et al. |
| 2007/0298883 A1 | 12/2007 | Feldman et al. |
| 2008/0070684 A1 | 3/2008 | Haigh-Hutchinson |
| 2008/0122786 A1 | 5/2008 | Pryor et al. |
| 2008/0139307 A1 | 6/2008 | Ueshima et al. |
| 2008/0152191 A1 | 6/2008 | Fujimura et al. |
| 2008/0161997 A1* | 7/2008 | Wengelnik et al. ............ 701/36 |
| 2008/0192005 A1 | 8/2008 | Elgoyhen et al. |
| 2008/0225041 A1* | 9/2008 | El Dokor et al. ............ 345/419 |
| 2008/0244465 A1 | 10/2008 | Kongqiao et al. |
| 2008/0258921 A1 | 10/2008 | Woo et al. |
| 2008/0273755 A1 | 11/2008 | Hildreth |
| 2009/0015681 A1 | 1/2009 | Pipkorn |
| 2009/0023555 A1 | 1/2009 | Raymond |
| 2009/0048070 A1 | 2/2009 | Vincent et al. |
| 2009/0055205 A1 | 2/2009 | Nguyen et al. |
| 2009/0077504 A1 | 3/2009 | Bell et al. |
| 2009/0085864 A1 | 4/2009 | Kutliroff et al. |
| 2009/0103780 A1 | 4/2009 | Nishihara et al. |
| 2009/0109795 A1 | 4/2009 | Marti |
| 2009/0113389 A1 | 4/2009 | Ergo et al. |
| 2009/0128564 A1* | 5/2009 | Okuno .................... G06T 15/20 |
| | | 345/427 |
| 2009/0175540 A1 | 7/2009 | Dariush et al. |
| 2009/0232353 A1 | 9/2009 | Sundaresan et al. |
| 2009/0234614 A1 | 9/2009 | Kahn et al. |
| 2009/0262986 A1 | 10/2009 | Cartey et al. |
| 2009/0271821 A1 | 10/2009 | Zalewski |
| 2009/0284462 A1 | 11/2009 | Chen et al. |
| 2009/0298650 A1 | 12/2009 | Kutliroff |
| 2009/0315827 A1 | 12/2009 | Elvesjo et al. |
| 2009/0315978 A1 | 12/2009 | Wurmlin et al. |
| 2010/0034457 A1 | 2/2010 | Berliner et al. |
| 2010/0053151 A1 | 3/2010 | Marti et al. |
| 2010/0060570 A1 | 3/2010 | Underkoffler et al. |
| 2010/0066676 A1 | 3/2010 | Kramer et al. |
| 2010/0067181 A1 | 3/2010 | Bair et al. |
| 2010/0092031 A1 | 4/2010 | Bergeron et al. |
| 2010/0103093 A1 | 4/2010 | Izumi |
| 2010/0111370 A1 | 5/2010 | Black et al. |
| 2010/0134618 A1 | 6/2010 | Kim et al. |
| 2010/0197400 A1 | 8/2010 | Geiss |
| 2010/0208038 A1 | 8/2010 | Kutliroff et al. |
| 2010/0215257 A1 | 8/2010 | Dariush et al. |
| 2010/0238168 A1* | 9/2010 | Kim et al. ................ 345/420 |
| 2010/0241998 A1* | 9/2010 | Latta et al. ............... 715/862 |
| 2010/0303289 A1 | 12/2010 | Polzin et al. |
| 2010/0306699 A1 | 12/2010 | Hsu et al. |
| 2010/0321289 A1 | 12/2010 | Kim et al. |
| 2011/0075257 A1* | 3/2011 | Hua et al. ................ 359/464 |
| 2011/0080336 A1 | 4/2011 | Leyvand et al. |
| 2011/0085705 A1 | 4/2011 | Izadi et al. |
| 2011/0090407 A1 | 4/2011 | Friedman |
| 2011/0119640 A1 | 5/2011 | Berkes et al. |
| 2011/0134250 A1 | 6/2011 | Kim et al. |
| 2011/0134251 A1 | 6/2011 | Kim et al. |
| 2011/0154266 A1 | 6/2011 | Friend et al. |
| 2011/0164029 A1 | 7/2011 | King et al. |
| 2011/0193778 A1 | 8/2011 | Lee et al. |
| 2011/0193939 A1 | 8/2011 | Vassigh et al. |
| 2011/0221666 A1 | 9/2011 | Newton et al. |
| 2011/0234481 A1 | 9/2011 | Katz et al. |
| 2011/0249107 A1 | 10/2011 | Chiu |
| 2011/0262002 A1 | 10/2011 | Lee |
| 2011/0271235 A1* | 11/2011 | Doyen et al. ................ 715/863 |
| 2011/0289456 A1 | 11/2011 | Reville et al. |
| 2011/0304842 A1 | 12/2011 | Kao et al. |
| 2011/0310125 A1 | 12/2011 | McEldowney et al. |
| 2011/0310226 A1 | 12/2011 | McEldowney |
| 2011/0316790 A1 | 12/2011 | Ollila et al. |
| 2011/0317871 A1 | 12/2011 | Tossell et al. |
| 2012/0038739 A1 | 2/2012 | Welch et al. |
| 2012/0038796 A1 | 2/2012 | Posa et al. |
| 2012/0050273 A1 | 3/2012 | Yoo et al. |
| 2012/0050483 A1 | 3/2012 | Boross et al. |
| 2012/0051588 A1 | 3/2012 | McEldowney |
| 2012/0062558 A1 | 3/2012 | Lee et al. |
| 2012/0069168 A1 | 3/2012 | Huang et al. |
| 2012/0119988 A1 | 5/2012 | Izumi |
| 2012/0176481 A1 | 7/2012 | Lukk et al. |
| 2012/0204133 A1 | 8/2012 | Guendelman et al. |
| 2012/0242796 A1 | 9/2012 | Ciurea et al. |
| 2012/0249741 A1 | 10/2012 | Maciocci et al. |
| 2012/0257035 A1 | 10/2012 | Larsen |
| 2012/0272179 A1 | 10/2012 | Stafford |
| 2012/0277594 A1 | 11/2012 | Pryor |
| 2012/0303839 A1 | 11/2012 | Jackson et al. |
| 2012/0309532 A1 | 12/2012 | Ambrus et al. |
| 2012/0313955 A1 | 12/2012 | Choukroun |
| 2012/0326963 A1 | 12/2012 | Minnen |
| 2012/0327218 A1 | 12/2012 | Baker et al. |
| 2013/0014052 A1 | 1/2013 | Frey et al. |
| 2013/0050425 A1 | 2/2013 | Im et al. |
| 2013/0050426 A1 | 2/2013 | Sarmast et al. |
| 2013/0055120 A1 | 2/2013 | Galor et al. |
| 2013/0076633 A1 | 3/2013 | Lithwick et al. |
| 2013/0139079 A1 | 5/2013 | Kitao et al. |
| 2013/0154913 A1 | 6/2013 | Genc et al. |
| 2013/0204408 A1 | 8/2013 | Thiruvengada et al. |
| 2013/0215027 A1 | 8/2013 | Van Lydegraf et al. |
| 2013/0222394 A1 | 8/2013 | Fyke |
| 2013/0249786 A1 | 9/2013 | Wang |
| 2013/0300659 A1 | 11/2013 | Kang et al. |
| 2013/0307771 A1 | 11/2013 | Parker et al. |
| 2013/0307773 A1 | 11/2013 | Yagishita |
| 2013/0336550 A1 | 12/2013 | Kapur et al. |

(56) References Cited

U.S. PATENT DOCUMENTS

2014/0254883 A1 9/2014 Kim et al.
2014/0267588 A1 9/2014 Arcas et al.

FOREIGN PATENT DOCUMENTS

| EP | 2393298 | 12/2011 |
|---|---|---|
| EP | 2538305 | 12/2012 |
| JP | 2002041038 | 2/2002 |
| JP | 2007514242 | 5/2007 |
| JP | 2007-316882 A | 12/2007 |
| JP | 2007316882 A | 12/2007 |
| JP | 2007318262 | 12/2007 |
| JP | 2010015553 | 1/2010 |
| JP | 2010539590 | 12/2010 |
| JP | 2011064498 | 3/2011 |
| JP | 2011081480 | 4/2011 |
| JP | 2011158834 | 8/2011 |
| JP | 2012-088688 | 5/2012 |
| KR | 2005-0066400 | 6/2005 |
| KR | 2006-0070280 | 12/2007 |
| KR | 1020060070280 | 12/2007 |
| KR | 2011-0032246 | 3/2011 |
| KR | 2012-0020045 | 3/2012 |
| KR | 2012-0031805 | 4/2012 |
| KR | 2013-0018464 | 2/2013 |
| WO | WO-9919788 A1 | 4/1999 |
| WO | WO-9919788 A1 | 4/1999 |
| WO | WO-0207839 A2 | 1/2002 |
| WO | WO-2005114556 A2 | 12/2005 |
| WO | WO-2005114556 A2 | 12/2005 |
| WO | WO-2011036618 A2 | 3/2011 |
| WO | WO-2011036618 A2 | 3/2011 |

OTHER PUBLICATIONS

Alon, J., et al., "Accurate and Efficient Gesture Spotting via Pruning and Subgesture Reasoning", Computer Vision in Human-Computer Interaction Lecture Notes in Computer Science, LNCS, Springer, Berlin, DE, pp. 189-198, Jan. 1, 2005.
Oikonomidis , I., et al., "Efficient Model-Based 3D Tracking of Hand Articulations using Kinect", 22nd British Machine Vision Conference, pp. 1-11, Aug. 29-Sep. 2, 2011.
Portillo-Rodriguez, O., et al., "Development of a 3D real time gesture recognition methodology for virtual environment control", Robot and Human Interactive Communication, 2008 Ro-Man 2008, The 17th IEEE International Symposium on, IEEE, Piscataway, N.J., U.S.A. pp. 279-284, Aug. 1, 2008.
Co-pending U.S. Appl. No. 11/886,280 by Kutliroff, G., et al., filed Oct. 2, 2007.
Co-pending U.S. Appl. No. 12/392,879 by Kutliroff, G., et al., filed Feb. 25, 2009.
Co-pending U.S. Appl. No. 13/532,609 by Kutlirofff, G., et al., filed Jun. 25, 2012.
Notice of Allowance Mailed Mar. 15, 2011, in Co-Pending U.S. Appl. No. 11/886,280 by Kutliroff, G., et al., filed Oct. 2, 2007.
Restriction Requirement Mailed Aug. 31, 2010, in Co-pending U.S. Appl. No. 12/392,879 Kutliroff, G., filed Feb. 25, 2009.
Non-Final Office Action Mailed Dec. 22, 2010, in Co-pending U.S. Appl. No. 12/392,879 by Kutliroff, G., filed Feb. 25, 2009.
Final Office Action Mailed Jun. 10, 2011, in Co-pending U.S. Appl. No. 12/392,679 by Kutliroff, G., filed Feb. 25, 2009.
Notice of Allowance Mailed Oct. 21, 2011, in Co-pending U.S. Appl. No. 12/392,879 by Kutliroff, G., filed Feb. 25, 2009.
Martin Haker "Scale-Invariant Range Features for the Time-of-Flight Camera Applications" pp. 6, 2008.
Fujiki R., Arita D., and Taniguchi, R.: Real-time 3D hand shape estimation based on inverse kinematics and physical constrains. Proc ICIAP Springer LNCS 2005, Fabio Rolio and Sergio Vitulano (Eds.). 3817:850-858, 2005.

Hansen, D., et al., "In the Eye of the Beholder: A Survey of Models for Eyes and Gaze," IEEE Transaction on Pattern Analysis and Machine Intelligence, vol. 32, Issue 3, pp. 478-500, Mar. 2010.
Keskin, C., et al., Real Time Hand Tracking and 3D Gesture Recognition for Interactive Interfaces Using HMM, Computer Engineering Dept. Bogazici Univeristy, pp. 1-4, 2003.
Pavlovis, V.I., et al., Visual Interpretation of Hand Gestures for Human-Computer Interaction: A Review, Department of Electrical and Computer Engineering, and The Beckman Institute for Advanced Science and Technology University of Illinois at Urban-Champaign, 36 pages, Jul. 1997.
Portillo-Rodriguez, O., et al., "Development of a 3D real time gesture recognition methodology for virtual environment control", Robot and Human Interactive Communication, 2008 Ro-Man 2008, The 17th IEEE International Symposium on, IEEE, Piscataway, N.J., U.S.A. pp. 279-284, Aug. 1, 2008.
Extended Search Report with Supplementary Search Report and Search Opinion Mailed Jun. 18, 2013 for European Patent Application No. EP 10744130 filed Feb. 4, 2010.
Co-pending U.S. Appl. No. 11/866,280 by Kurtliroff, G., et al., filed Oct. 2, 2007.
Co-pending U.S. Appl. No. 13/310,510 by Kutliroff, G., et al., filed Dec. 2, 2011.
Co-pending U.S. Appl. No. 12/392,879 by Kutliroff, G., et al., filed Feb. 25, 2009.
Co-pending U.S. Appl. No. 12/707,340 by Kutliroff, G., et al., filed Feb. 17, 2010.
Non-Final Office Action Mailed Jan. 29, 2013, in Co-pending U.S. Appl. No. 12/817,102 by Kutliroff, G., et al., filed Jun. 16, 2010.
Chu, Shaowei, and Jiro Tanaka, "Hand gesture for taking self portrait." Human-Computer Interaction, Interaction Techniques and Environments. Srpinger Berlin Heifelberg, 2011, 238-247.
Li, Zhi, and Ray Jarvis. "Real time hand gesture recognition using a range camera." Australasian Conference on Robotics and Automation, 2009.
Jenkinson, Mark, The Complete Idiot's Guide to Photography Essentials. Penguin Group, 2008. Safari Books Online. Web. Mar. 4, 2014.
Gil, Pablo, Jorge Pomares, and Fernando Torres. "Analysis and adaptation of integration time in PMD camera for visual serving." Pattern Recognition (ICPR), 2010 20th International Conference on, IEEE, 2010.
Murino, V.; Regazzoni, C.S.; Foresti, G.L., "Real-time adaptive regulation of a visuai camera for automatic investigation of changing environments," Industrial Electronics, Control, and Instrumentation, 1993. Proceedings of the IECON '93., International Conference on, vol., no., pp. 1633, 1638 vol. 3, Nov. 15-18, 1993.
Gil, P.; Pomares, J.; Torres, F., "Analysis and Adaptation of Integration Time in PMD Camera for Visual Servoing," Pattern Recognition (ICPR), 2010 20th International Conference on, vol., No. oo.311, 315, Aug. 23-26, 2010.
D. Hansen, et al., "In the Eye of the Beholder: A Survey of Models for Eyes and Gaze," IEEE Transactions on Pattern Analysis and Machine Intelligence, vol. 32, Issue 3.: Mar. 2010, pp. 478-500.
Extended European Search Report for EP Counterpart Application No. 12173256.4, 10 pgs., (Jul. 31, 2013).
Stefan Soutschek et al., "3-D Gesture-Based Scene Navigation in Medical Imaging Applications Using Time-of-Flight-Cameras" pp. 6, 2008.
Martin Haker "Scale-Invariant Range Features for Time-of-Flight Camera Applications" pp. 6, 2008.
Alon, J., et al., "Accurate and Efficient Gesture Spotting vie Pruning and Subgesture Reasoning", Computer Vision in Human-Computer Interaction Lecture Notes in Computer Science, LNCS, Springer, Berlin, DE, pp. 189-198, Jan. 1, 2005.
Fujiki R., Arita D., and Taniguchi, R.: Real-time 3D hand shape estimation based on inverse kinematics and physical constrains. Proc ICIAP Springer LNCS 2005, Fabio Rolio and Sergio Vitulano (Eds.). 3617:850-858, 2005.
Hansen, D., et al., "In the Eye of the Beholder: A Survey of Models for Eyes and Gaze," IEEE Transactions on Pattern Analysis and Machine Intelligence, vol. 32, Issue 3, pp. 478-500, Mar. 2010.

(56) References Cited

OTHER PUBLICATIONS

Keskin, C., et al., Real Time Hand Tracking and 3D Gesture Recognition for Interactive Interfaces Using HMM, Computer Engineering Dept. Bogazici University, pp. 1-4, 2003.
Lewis, J.P., et al., "Pose space deformations: A unified approach to shape interpolation and skeleton-driven deformation", Annual Conference Series, ACM SIGGRAPH, pp. 165-172, 2000.
Mackie, J., et al., "Finger Detection with Decision Trees, 2004. Proceedings of image and Vision Computing New Zealand", pp. 399-403, 2004.
Oikonomidis, I., et al., "Efficient Model-Based 3D Tracking of Hand Articulations using Kinect", $22^{nd}$ British Machine Vision Conference, pp. 1-11, Aug. 29-Sep. 2, 2011.
Pavlovis, V.I., et al., Visual Interpretation of Hand Gestures for Human-Computer Interaction: A Review, Department of Electrical and Computer Engineering, and the Beckman Institute for Advanced Science and Technology University of Illinois at Urbana-Champaign, 36 pages, Jul. 1997.
Segen, J., et al., Fast and Accurate 3D Gesture Recognition Interface, AT&T Bell Laboratories, Holmdel, NJ 07733, pp. 86-91, Aug. 16-20, 1997.
Portillo-Rodriguez, O., et al., "Development of a 3D real time gesture recognition methodology for virtual environment control", Robot and Human Interactive Communication, 2008 Ro-Man 2008, The $17^{th}$ IEEE International Symposium on, IEEE, Piscataway, N.J., U.S.A, pp. 279-284, Aug. 1, 2008.
Zhu, Y., et al., "Controlled Human Pose Estimation from Dept H Image Streams" IEEE Computer Society Conference on Computer Vision and Pattern Recognition Workshops (CVPRW 08), pp. 1-8, see Abstract: Sections 2, 3, and 5. Figure 1, Jun. 23-28, 2008.
Extended Search Report with Supplementary Search Report and Search Opinion Mailed Jun. 18, 2013, for European Patent Application No. EP 10744130 filed Feb. 4, 2010.
International Search Report and Written Opinion mailed Sep. 16, 2010, for International Application No. PCT/US2010/023179, filed Feb. 4, 2010, 7 pages.
International Search Report and Written Opinion mailed Feb. 28, 2013, for International Application No. PCT/US2012/047364, filed Jul. 19, 2012, 11 pages.
Co-pending U.S. Appl. No. 11/866,280 by Kutliroff, G. et al., filed Oct. 2, 2007.
Co-pending U.S. Appl. No. 13/310,510 by Kutliroff, G. et al., filed Dec. 2, 2011.
Co-pending U.S. Appl. No. 12/392,879 by Kutliroff, G. et al., filed Feb. 25, 2009.
Co-pending U.S. Appl. No. 12/707,340 by Kutliroff, G. et al., filed Feb. 17, 2010.
Co-pending U.S. Appl. No. 12/817,102 by Kutliroff, G., et al., filed Jun. 16, 2010.
Co-pending U.S. Appl. No. 13/441,271 by Bleiweiss, A., et al., filed Apr. 6, 2012.
Co-pending U.S. Appl. No. 13/552,978 by Yanai, Y., filed Jul. 19, 2012.
Co-pending U.S. Appl. No. 13/563,516 by Kutliroff, G., et al., filed Jul. 31, 2012.
Co-pending U.S. Appl. No. 13/652,181 by Yanai, Y., et al., filed Oct. 15, 2012.
Co-pending U.S. Appl. No. 13/676,017 by Kutliroff, G., et al., filed Nov. 13, 2012.
Co-pending U.S. Appl. No. 13/768,835 Fleischmann, S., et al., filed Feb. 15, 2013.
Co-pending U.S. Appl. No. 13/785,669 by Kutliroff, G., et al., filed Mar. 5, 2013.
Co-pending U.S. Appl. No. 13/857,009 Fleischmann, S., et al., filed Apr. 4, 2013.
Notice of Allowance Mailed Mar. 15, 2011, in Co-pending U.S. Appl. No. 11/866,280 by Kutliroff, G., et al., filed Oct. 2, 2007.
Restriction Requirement Mailed Aug. 31, 2010, in Co-pending U.S. Appl. No. 12/392,879 by Kutliroff, G., et al., filed Feb. 25, 2009.
Non-Final Office Action Mailed Dec. 22, 2010, in Co-pending U.S. Appl. No. 12/392,879 by Kutliroff, G., et al., filed Feb. 25, 2009.
Final Office Action Mailed Jun. 10, 2011, in Co-pending U.S. Appl. No. 12/392,879 by Kutliroff, G., et al., filed Feb. 25, 2009.
Non-Final Office Action Mailed Mar. 23, 2012, in Co-pending U.S. Appl. No. 12/707,340 by Kutliroff, G., et al., filed Feb. 17, 2010.
Final Office Action Mailed Sep. 14, 2012, in Co-pending U.S. Appl. No. 12/707,340 by Kutliroff, G., et al., filed Feb. 17, 2010.
Restriction Requirement Mailed Nov. 30, 2012, in Co-pending U.S. Appl. No. 12/817,102 by Kutliroff, G., et al., filed Jun. 16, 2010.
Non-Final Office Action Mailed Jan. 29, 2013, in Co-pending U.S. Appl. No. 12/817,102 by Kutliroff, G., et al., field Jun. 16, 2010.
Notice of Allowance mailed Jul. 29, 2013, in Co-pending U.S. Appl. No. 12/817,102 by Kutliroff, G., et al., filed Jun. 16, 2010.
Chu, Shaowei, and Jiro Tanaka, "Hand gesture for taking self portrait." Human-Computer Interaction. Interaction Techniques and Environments. Springer Berlin Heifelberg, 2011. 238-247.
Li, Zhi, and Ray Jarvis. "Real time hand gesture recognition using a range camera." Australasian Conference on Robotics and Automation. 2009.
Jenkinson, Mark. The Complete Idiot's Guide to Photography Essentials. Penguin Group, 2008. Safari Books Online. Web. Mar 4, 2014.
Raheja, Jagdish L., Ankit Chaudhary, and Kunal Singal. "Tracking of fingertips and centers of palm using Kinect." Computational Intelligence, Modelling and Simulation (CIMSIM), 2011 Third International Conference on. IEEE, 2011.
"zoom, V.". OED Online. Dec. 2013. Oxford University Press. Mar. 4, 2014.
PCT Search Report and Written Opinion, PCT/US2013/052894, 11 pages, Nov. 12, 2013.
Gil, Pablo, Jorge Pomares, and Fernando Torres. "Analysis and adaptation of integration time in PMD camera for visual serving." Pattern Recognition (ICPR), 2010 $20^{th}$ International Conference on. IEEE, 2010.
Ziraknejad, N.; Lawrence, P.D.; Romilly, D.P., "The effect of Time-of-Flight camera integration time on vehicle driver head pose tracking accuracy." Vehicular Electronics and Safety (ICVES), 2012 IEEE International Conference on, vol., no., pp. 247, 254, Jul. 24-27, 2012.
Murino, V.; Regazzoni, C.S.; Foresti, G.L., "Real-time adaptive regulation of a visual camera for automatic investigation of changing environments," Industrial Electronics, Control, and Instrumentation, 1993. Proceedings of the IECON '93., International Conference on, vol., no., pp. 1633, 1638 vol. 3, Nov. 15-19, 1993.
Murino, V.; Regazzoni, C.S., "Visual surveillance by depth from focus," Industrial Electronics, Control and Instrumentation, 1994. IECON '94., $20^{th}$ International Conference on, vol. 2, no., pp. 998, 1003 vol. 2, Sep. 5-9, 1994.
Murino, V.; Foresti, G.L.; Regazzoni, C.S., "Adaptive camera regulation for investigation of real scenes," Industrial Electronics, IEEE Transactions on, vol. 43, No. 5, pp. 588, 600, Oct. 1996.
Gil, P.; Pomares, J.; Torres, F., "Analysis and Adaptation of Integration Time in PMD Camera for Visual Servoing," Pattern Recognition (ICPR), 2010 $20^{th}$ International Conference on, vol., No. 00.311, 315, Aug. 23-26, 2010.
PCT Search Report and Written Opinion, PCT/US2013/065019, 10 pages, Jan. 24, 2014.
PCT Search Report and Written Opinion, PCT/US2014/013618, May 14, 2014 11 pages.
Murugappan et al., "Extended Multitouch: Recovering Touch Posture, Handedness, and User Identity using a Depth Camera", Proceedings of the $25^{th}$ annual ACM symposium on User Interface Software and Technology, copyright ACM 2012, pp. 1-11.
D. Hansen, et al., "In the Eye of the Beholder: A Survey of Models for Eyes and Gaze," IEEE Transactions on Pattern Analysis and Machine Intelligence, vol. 32, Issue 3,: Mar. 2010, pp. 478-500.
PCT Search Report and Written Opinion, PCT/US2014/014440, May 22, 2014, 14 pages.
Non-Final Office Action for U.S. Appl. No. 13/563,516, mailed Aug. 29, 2014, 34 pgs.
Non-Final Office Action for U.S. Appl. No. 13/563,516, mailed Jan. 14, 2014, 29 pgs.

(56) References Cited

OTHER PUBLICATIONS

Non-Final Office Action for U.S. Appl. No. 13/563,516, mailed Mar. 11, 2014, 32 pgs.
Final Office Action for U.S. Appl. No. 13/563,516, mailed Oct. 16, 2014, 29 pgs.
Final Office Action for U.S. Appl. No. 13/563,516, mailed Apr. 24, 2014, 64 pgs.
Non-Final Office Action for U.S. Appl. No. 13/441,271, mailed May 7, 2014, 14 pgs.
Final Office Action for U.S. Appl. No. 13/441,271, mailed Aug. 20, 2014, 16 pgs.
Non-Final Office Action for U.S. Appl. No. 13/532,609, mailed Nov. 13, 2014, 45 pgs.
Non-Final Office Action for U.S. Appl. No. 13/532,609, mailed Jun. 29, 2015, 43 pgs.
Final Office Action for U.S. Appl. No. 13/532,609, mailed Aug. 5, 2015, 43 pgs.
Non-Final Office Action for U.S. Appl. No. 13/532,609, mailed Jan. 21, 2016, 39 pgs.
Final Office Action for U.S. Appl. No. 13/532,609, mailed Mar. 18, 2015, 50 pgs.
Non-Final Office Action for U.S. Appl. No. 14/135,388, mailed May 19, 2015, 27 pgs.
Non-Final Office Action for U.S. Appl. No. 14/135,388, mailed Dec. 18, 2014, 23 pgs.
Notice of Allowance and Fees for U.S. Appl. No. 14/135,388, mailed Jan. 14, 2016, 10 pgs.
Final Office Action for U.S. Appl. No. 14/135,388, mailed Aug. 4, 2015, 21 pgs.
Final Office Action for U.S. Appl. No. 14/135,388, mailed Feb. 18, 2015, 33 pgs.
Non-Final Office Action for Japanese Patent Application No. 2015-514248, mailed Feb. 16, 2016, 12 pgs.
International Search Report and Written Opinion for PCT Patent Application No. PCT/US2014/050685 mailed Nov. 19, 2014, 13 pgs.
Non-Final Office Action for U.S. Appl. No. 13/972,621 mailed Mar. 13, 2015, 23 pgs.
Final Office Action for U.S. Appl. No. 13/972,621 mailed Jul. 22, 2015, 39 pgs.
Non-Final Office Action for U.S. Appl. No. 13/552,978 mailed Oct. 5, 2015, 22 pgs.
Non-Final Office Action for U.S. Appl. No. 13/552,978 mailed Jan. 12, 2016, 36 pgs.
Final Office Action for U.S. Appl. No. 13/552,978 mailed Mar. 23, 2016, 21 pgs.
Non-Final Office Action for U.S. Appl. No. 13/552,978 mailed Dec. 11, 2014, 37 pgs.
Final Office Action for U.S. Appl. No. 13/552,978 mailed Apr. 28, 2015, 41 pgs.
Non-Final Office Action for U.S. Appl. No. 13/785,669, mailed Oct. 22, 2014, 26 pgs.
Final Office Action for U.S. Appl. No. 13/785,669, mailed Mar. 2, 2015, 28 pgs.
Non-Final Office Action for U.S. Appl. No. 13/768,835, mailed Oct. 8, 2014, 20 pgs.
Notice of Allowance and Fees for U.S. Appl. No. 13/768,835, mailed Dec. 5, 2014, 5 pgs.
Non-Final Office Action for U.S. Appl. No. 13/652,181, mailed Jun. 5, 2015, 35 pgs.
Final Office Action for U.S. Appl. No. 13/652,181, mailed Sep. 25, 2015, 16 pgs.
Lee, Gun A., et al., "Occlusion based Interaction Methods for Tangible Augmented Reality Environments", 2004 ACM 1-58113-884-3/04/00006, 8 pgs.
Non-Final Office Action for Japanese Patent Application No. 2012-140086, mailed May 1, 2015, 4 pgs.
Extended European Search Report for European Patent Application No. 13825483.4, mailed Mar. 24, 2016, 8 pgs.

* cited by examiner

SYSTEM AND METHOD FOR COMBINING THREE-DIMENSIONAL TRACKING WITH A THREE-DIMENSIONAL DISPLAY FOR A USER INTERFACE

CROSS-REFERENCE TO RELATED APPLICATIONS

This application claims priority from U.S. Provisional Patent Application No. 61/621,957, filed Apr. 9, 2012, entitled "TECHNIQUE FOR A USER INTERFACE COMBINING THREE-DIMENSIONAL TRACKING WITH A THREE-DIMENSIONAL DISPLAY," which is incorporated by reference in its entirety.

BACKGROUND

Typically, humans physically manipulate controls, press buttons, or touch screens to interact with electronic devices, such as computers, tablets, and mobile phones. For example, users interact with computers via input devices, such as a keyboard and mouse. While a keyboard and mouse are effective devices for performing functions such as entering text and scrolling through documents, they are not effective for many other ways in which a user could interact with an electronic device. A user's hand holding a mouse is constrained to move only along flat two-dimensional (2D) surfaces, and navigating with a mouse through three dimensional virtual spaces is clumsy and non-intuitive. Similarly, the flat interface of a touch screen does not allow a user to convey any notion of depth.

BRIEF DESCRIPTION OF THE DRAWINGS

Examples of a user interface system that combines three-dimensional tracking with a three-dimensional display are illustrated in the figures. The examples and figures are illustrative rather than limiting.

FIG. 6A shows an upturned open hand with the fingers spread apart; FIG. 6B shows a hand with the index finger pointing outwards parallel to the thumb and the other fingers pulled toward the palm; FIG. 6C shows a hand with the thumb and middle finger forming a circle with the other fingers outstretched; FIG. 6D shows a hand with the thumb and index finger forming a circle and the other fingers outstretched; FIG. 6E shows an open hand with the fingers touching and pointing upward; and FIG. 6F shows the index finger and middle finger spread apart and pointing upwards with the ring finger and pinky finger curled toward the palm and the thumb touching the ring finger.

FIG. 7A shows a dynamic wave-like gesture; FIG. 7B shows a loosely-closed hand gesture; FIG. 7C shows a hand gesture with the thumb and forefinger touching; and FIG. 7D shows a dynamic swiping gesture.

DETAILED DESCRIPTION

Figure 1:
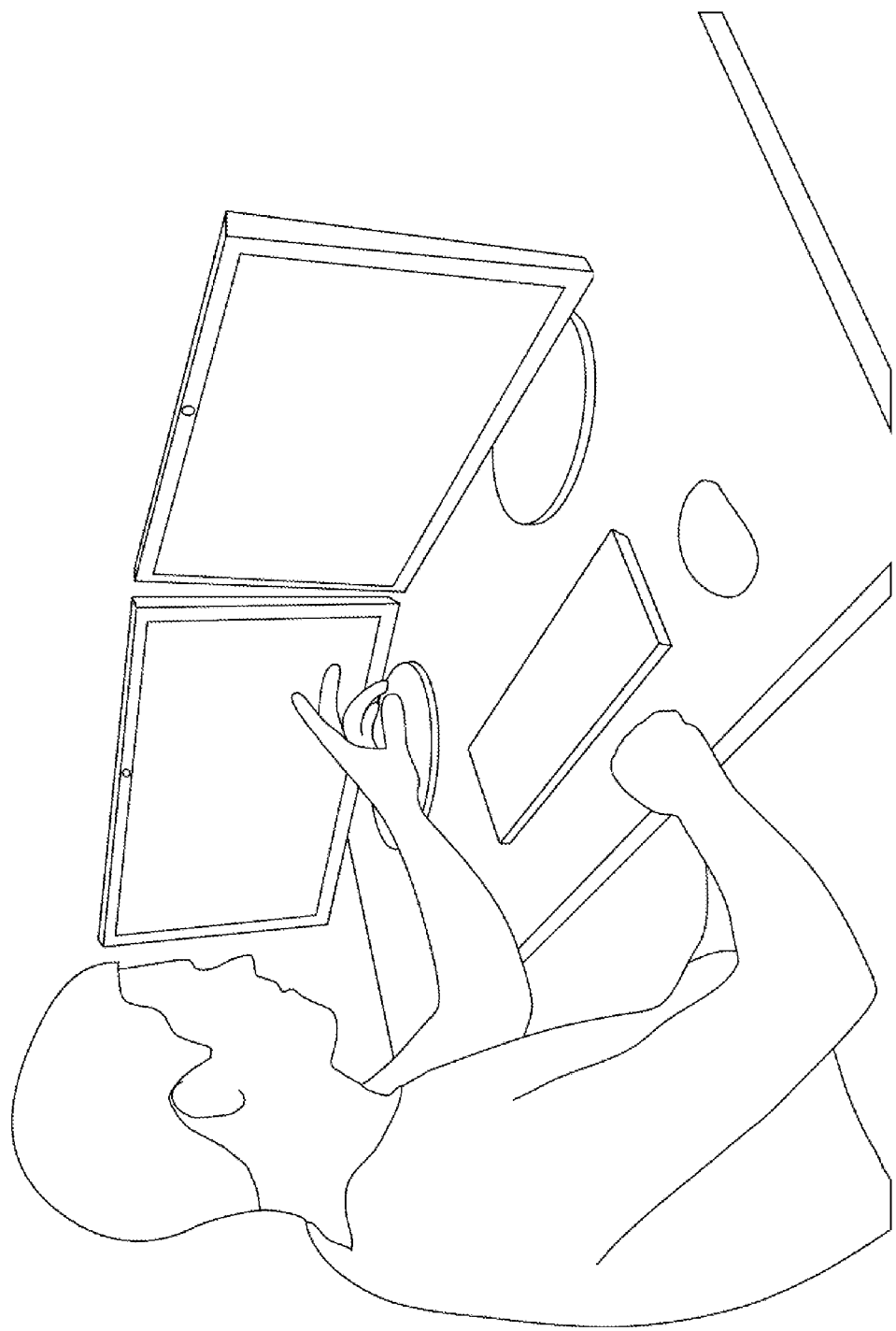
FIG. 1 is a diagram illustrating an example environment in which a user interacts with one or more monitors.

Systems and methods for combining three-dimensional tracking of a user's movements with a three-dimensional user interface display are described. A tracking module processes depth data of a user performing movements, for example, movements of the user's hand and fingers. The tracked movements are used to animate a representation of the hand and fingers, and the animated representation is displayed to the user using a three-dimensional display. Also displayed are one or more virtual objects with which the user can interact. In some embodiments, the interaction of the user with the virtual objects controls an electronic device.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

While we live in a three-dimensional (3D) world, our interactions with conventional electronic devices are, for the most part, two-dimensional (2D) interactions. Enabling users to interact freely in 3D space with an electronic device can enrich the user experience by providing a larger, less restrictive, interaction area which is not limited by a physical device. Moreover, this type of system allows for a user interface that is both more intuitive and more natural, since user 3D interactions more closely reflect how people interact with objects in the real world. The extension of user interfaces to enable 3D interactions is predicated on two capabilities—the ability to interpret the user's movements in 3D without restricting the user's movements to a physical device, and the ability to display 3D information to the user.

A user interface system, therefore, can have two basic components. The first component displays information to the user, for example, a display screen, such as a flat panel display, or an image projected onto a vertical, flat wall. The display component shows the user a collection of graphical (or other) elements with which the user may interact.

The second component of the user interface system interprets the user's intentions in relation to the information presented to the user by the display component. For example, a tablet may display information to the user on a flat panel display screen, and then interpret the user's intentions by detecting where the user's fingers touch the screen relative to the displayed information. Generally, the user's actions have an immediate effect on the displayed information, thus providing the user feedback that indicates how the user's actions were interpreted by the application running the user interface system on the electronic device with which the user is interacting.

In the particular case of depth camera-based tracking of the user's hands and fingers, there is an additional dimension in which the user may move that is not available to the user of a touch screen device: depth, or the distance between the user's hands/fingers and the items with which the user is interacting. That is, the user may move his hands freely in space—in any of the available three dimensions. Using data generated by depth cameras, the positions of the user's hand joints may be robustly and accurately tracked, and provided as input to the application. In addition to tracking the user's hands and fingers, data from the camera may also be used to track other parts of the user's body, such as the location and orientation of the user's head. Because of the availability of highly accurate, robust data describing the real-time movements of the user's hands, fingers, and head (among other body parts), a two-dimensional (2D) display is an insufficient medium with which to present the user with visual cues and feedback.

The current disclosure describes a system in which a depth camera is combined with a tracking module and a three-dimensional (3D) display. The tracking module interprets the data from the depth camera to track the user's hands and fingers and interpret the poses of the user's hands and fingers, while the 3D display provides feedback to the user.

The advantage of a 3D display, in contrast to a 2D display, is that the virtual cues and feedback presented to the user are more consistent with the user's perception of space. That is, the three-dimensional freedom of movement of the user's hands and fingers is mirrored by the 3D virtual space with which the user is interacting. The similar dimensionality between the 3D interaction space and the 3D display space provides the user with a more consistent and intuitive experience. The present disclosure describes techniques to integrate the 3D interactive space and the 3D display space to provide the user with a smooth, intuitive, and natural way to interact with a device.

A depth camera may contain a depth image sensor, an optical lens, and an illumination source, among other components. The depth image sensor may rely on one of several different sensor technologies. Among these sensor technologies are time-of-flight, known as "TOF", (including scanning TOF or array TOF), structured light, laser speckle pattern technology, stereoscopic cameras, active stereoscopic sensors, and shape-from-shading technology. Most of these techniques rely on active sensors that supply their own illumination source. In contrast, passive sensor techniques, such as stereoscopic cameras, do not supply their own illumination source, but depend instead on ambient environmental lighting. In addition to depth data, the cameras may also generate color ("RGB") data, in the same way that conventional color cameras do, and the color data can be combined with the depth data for processing.

The data generated by depth cameras has several advantages over that generated by RGB cameras. In particular, the depth data greatly simplifies the problem of segmenting the background of a scene from objects in the foreground, is generally robust to changes in lighting conditions, and can be used effectively to interpret occlusions. Using depth cameras, it is possible to identify and track both the user's hands and fingers in real-time, even complex hand configurations. Moreover, the present disclosure describes methods to project the graphical elements onto a display surface such that they are sharp and not distorted, and these methods may rely on the distance measurements generated by the depth camera, between the camera and objects in the camera's field-of-view.

U.S. patent application Ser. No. 13/532,609, entitled "System and Method for Close-Range Movement Tracking," filed Jun. 25, 2012, describes a method for tracking a user's hands and fingers based on depth images captured from a depth camera, and using the tracked data to control a user's interaction with devices, and is hereby incorporated in its entirety. U.S. patent application Ser. No. 13/441,271, entitled "System and Method for Enhanced Object Tracking", filed Apr. 6, 2012, describes a method of identifying and tracking a user's body part or parts using a combination of depth data and amplitude (or infrared image) data, and is hereby incorporated in its entirety in the present disclosure. U.S. patent application Ser. No. 13/676,017, entitled "System and Method for User Interaction and Control of Electronic Devices", filed Nov. 13, 2012, describes a method of user interaction for controlling electronic devices and is based on depth cameras with electronic devices, and is hereby incorporated in its entirety.

A 3D display is a display that conveys depth perception to the user. Different technologies may be used to create the perception of depth. For example, stereoscopy is a technique that relies on presenting different images to each of the eyes of the observer, where the images are slightly offset from each other. The human visual system tends to interpret the offset images as a unified, 3D scene. The user may be required to wear special glasses to strengthen the user's perception of the 3D effect of the scene. Holography is another technique that may be used to create the perception of depth for the user. A hologram is a reconstruction of a light field created by scattering light from a light source off of objects. A head-mounted display ("HMD") may also be used to provide a scene perceived to be three-dimensional by the user. Other techniques that create images that are perceived to be three-dimensional may also be used. Several scenarios where one or more users interact within a three-dimensional space with a three-dimensional display are described below.

FIG. 1 is a diagram illustrating an example environment in which a user interacts with two monitors at close-range. In some embodiments, there may be a depth camera on each of the two monitors. In some embodiments, there may be only a single monitor with a depth camera. The user, through movements of the hands and fingers, interacts with the screens. The depth camera captures live video of the movements, and algorithms are applied to interpret the user's movements and determine the user's intentions. The screens in front of the user may be 3D-enabled, so the user may perceive objects in 3D space. These 3D-enabled screens provide feedback to the user, so as to enable the user to have a fluid interaction with the application.

Figure 2:
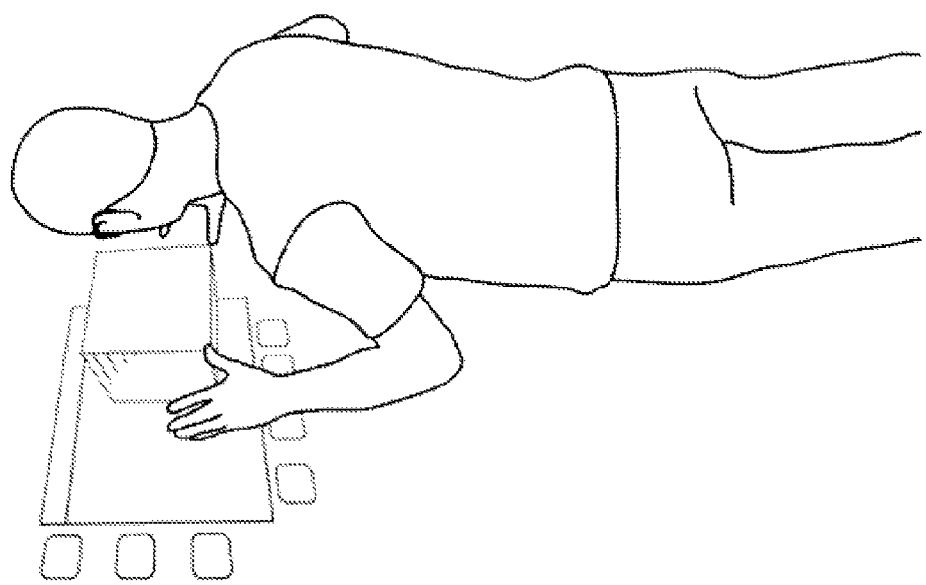
FIG. 2 is a diagram illustrating an example environment of a user interacting with a three-dimensional screen.

FIG. 2 is a diagram illustrating an example environment in which a user interacts with a 3D display screen. The user is wearing glasses that allow each eye to perceive different elements of the image, to create the effect of a 3D scene. The user also uses hands and fingers to interact with elements of the 3D image. A depth camera, in combination with a tracking algorithms module, tracks the positions of the joints of the user's hands, so that the user's movements can drive interaction with the application.

Figure 3:
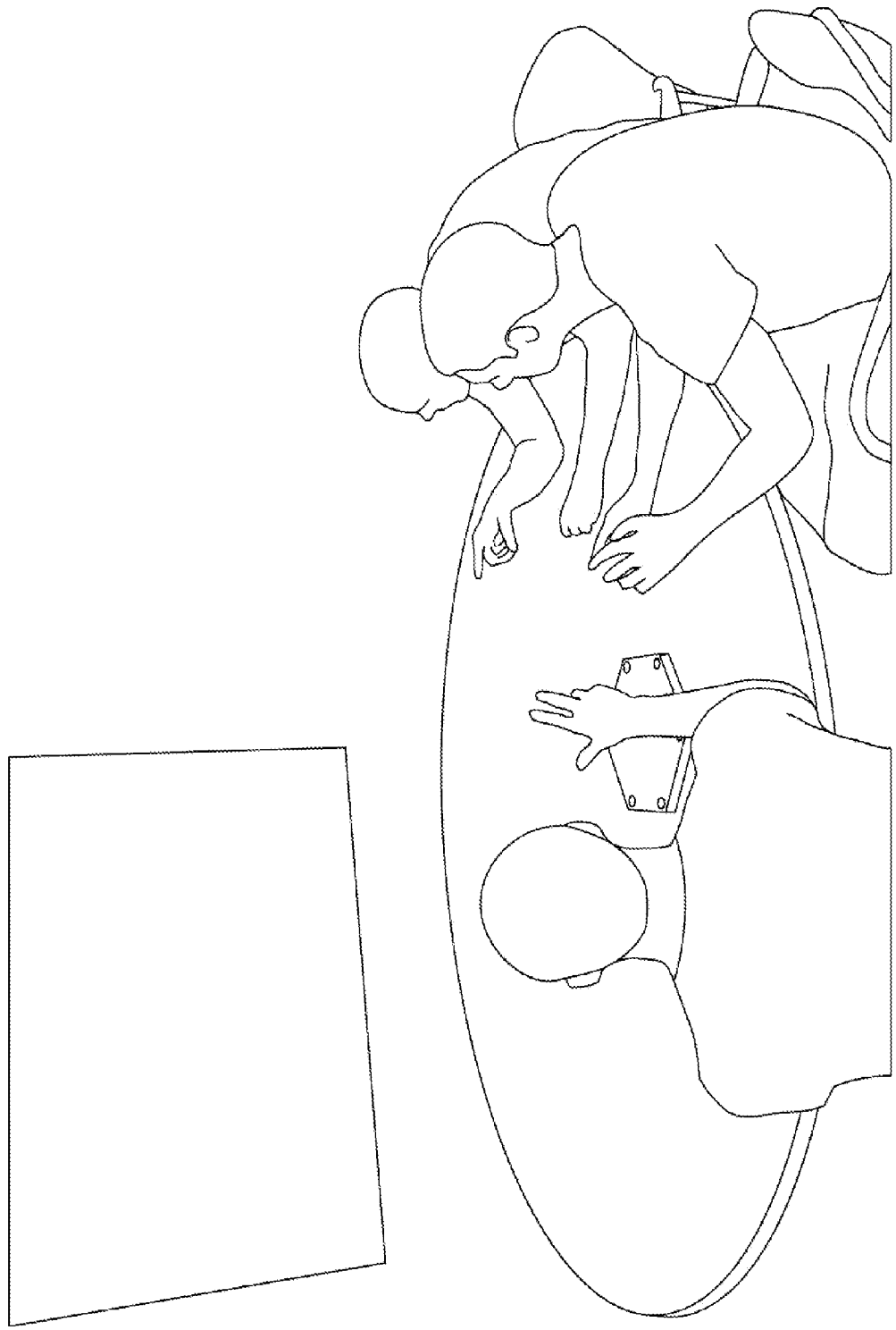
FIG. 3 is a diagram illustrating an example environment in which a standalone device using one or more depth cameras is used to capture user interactions and feedback is provided via a three-dimensional enabled screen.

FIG. 3 is a diagram illustrating an example environment of another application of the present disclosure. In this embodiment, a standalone device may contain a single depth camera, or multiple depth cameras, positioned around the periphery of the device. Individuals may then interact with their environment via the movements of their hands and fingers, which are detected by the camera and interpreted by the tracking algorithms. The screen in front of the users may be 3D-enabled, so users may perceive objects in 3D space. The 3D-enabled screen provides feedback to the users, so as to enable the users to have fluid interactions with the application.

Figure 4:
FIG. 4 is a diagram illustrating an example environment in which multiple users interact simultaneously with an application designed to be part of an installation.

FIG. 4 is a diagram illustrating an example environment of another application of the present disclosure, in which multiple users interact simultaneously with an application designed to be part of an installation. The movements of the users' hands and fingers control their virtual environment, via a depth camera that captures live video of their movements, and tracking algorithms that interpret the video to determine the users' intentions from their movements. The screen in front of the users may be 3D-enabled, so users may perceive objects in 3D space. The 3D-enabled screen provides feedback to the users, so as to enable the users to have fluid interactions with the application.

Figure 5:
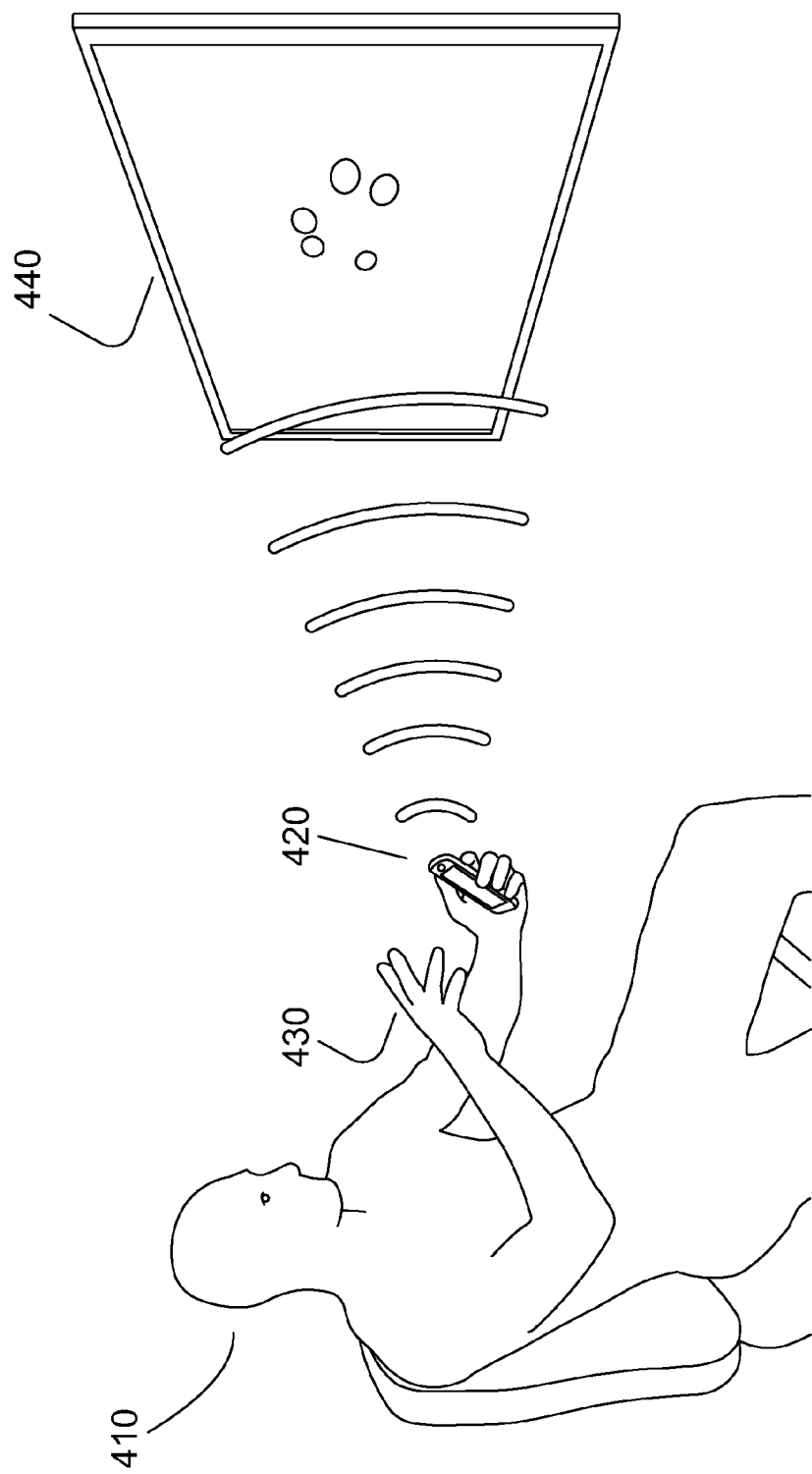
FIG. 5 is a diagram illustrating control of an example remote device through tracking of a user's hands and/or fingers.

FIG. 5 is a diagram of a still further example of an application of the present disclosure, in which a user 410 moves hands and fingers 430 while holding a handheld device 420 containing a depth camera. The depth camera captures live video of the movements and tracking algorithms are run on the video to interpret the user's movements. Further processing translates the user's hand/finger movements into gestures, which are used to control the large screen 440 which the user is watching. The screen in front of the user may be 3D-enabled, so the user may perceive objects in 3D space. The 3D-enabled screen provides feedback to the user, so as to enable the user to have a fluid interaction with the application.

Figure 6F:
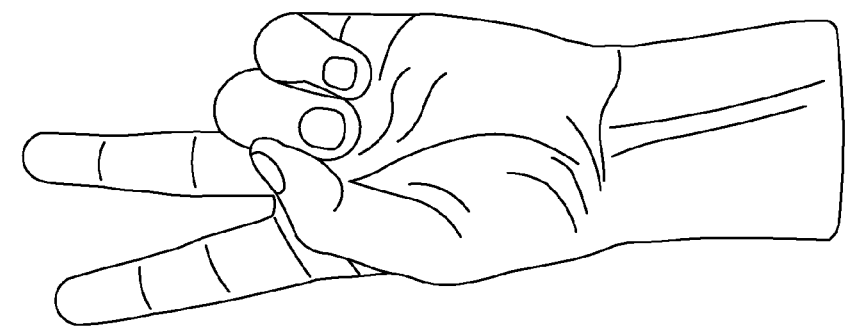
FIGS. 6A-6F show graphic illustrations of examples of hand gestures that may be tracked.
Figure 6D:
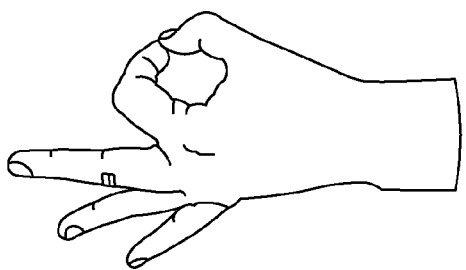
Figure 6E:
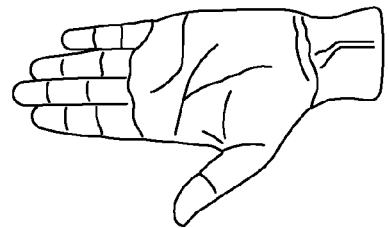
Figure 6A:
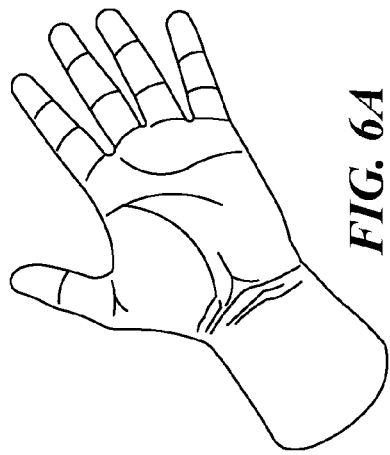
Figure 6B:
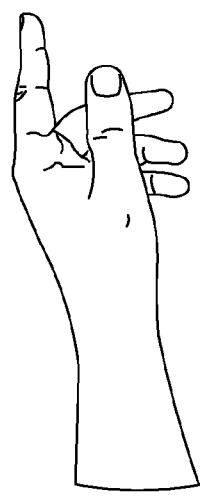
Figure 6C:
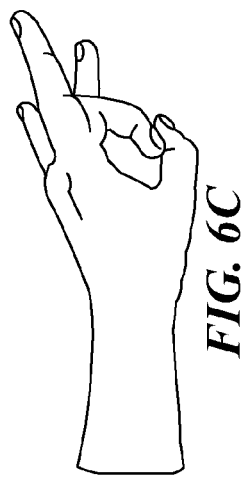

FIGS. 6A-6F show graphic illustrations of examples of hand gestures that may be tracked. FIG. 6A shows an upturned open hand with the fingers spread apart; FIG. 6B shows a hand with the index finger pointing outwards parallel to the thumb and the other fingers pulled toward the palm; FIG. 6C shows a hand with the thumb and middle finger forming a circle with the other fingers outstretched; FIG. 6D shows a hand with the thumb and index finger forming a circle and the other fingers outstretched; FIG. 6E shows an open hand with the fingers touching and pointing upward; and FIG. 6F shows the index finger and middle finger spread apart and pointing upwards with the ring finger and pinky finger curled toward the palm and the thumb touching the ring finger.

Figure 7A:
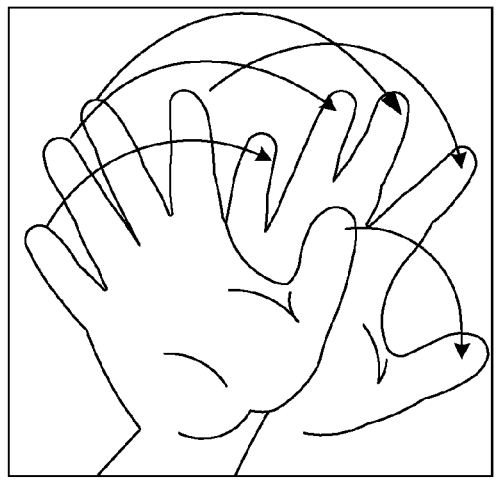
FIGS. 7A-7D show additional graphic illustrations of examples of hand gestures that may be tracked.
Figure 7B:
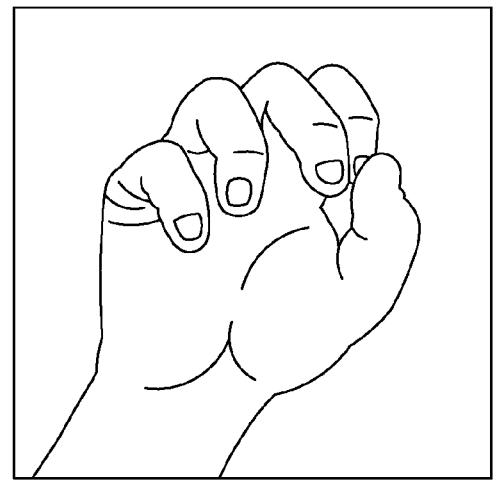
Figure 7C:
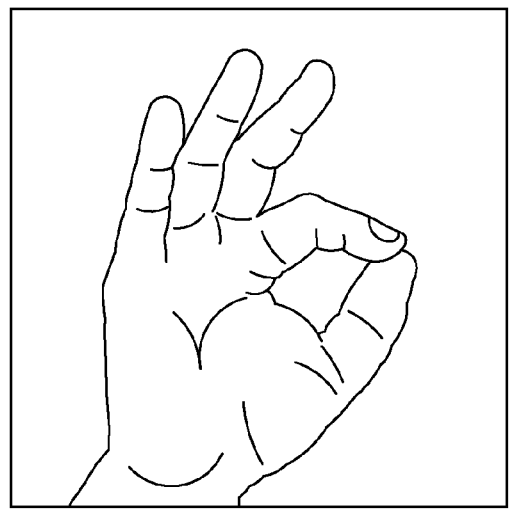
Figure 7D:
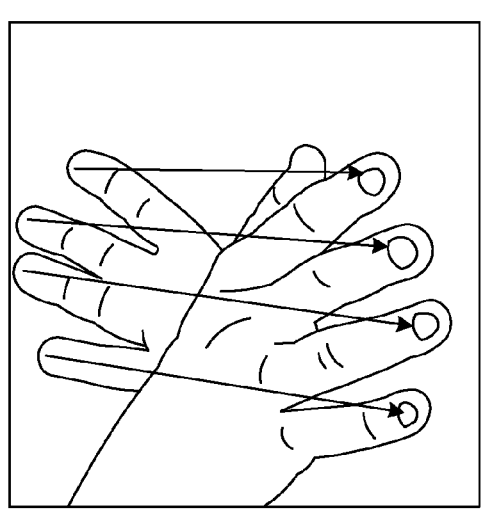

FIGS. 7A-7D show additional graphic illustrations of examples of hand gestures that may be tracked. FIG. 7A shows a dynamic wave-like gesture; FIG. 7B shows a loosely-closed hand gesture; FIG. 7C shows a hand gesture with the thumb and forefinger touching; and FIG. 7D shows a dynamic swiping gesture.

Figure 8:
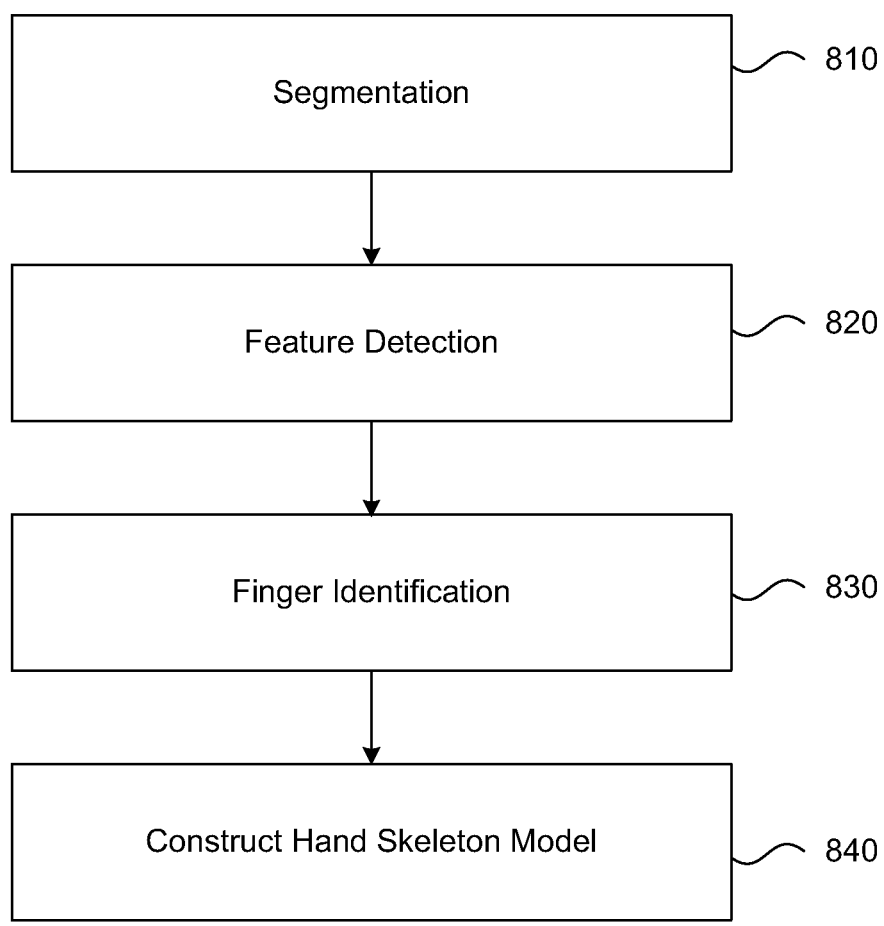
FIG. 8 is a workflow diagram describing an example process of tracking a user's hand(s) and finger(s) over a series of frames of captured images.

FIG. 8 is a workflow diagram describing an example process for tracking a user's hand(s) and finger(s), performed by, for example, a tracking module. The term "blob" refers to a group of contiguous pixels. At stage 810, a blob of pixels corresponding to one of the user's hands is segmented out from the rest of the depth image. If both of the user's hands are present in the depth image, then a blob of pixels for each of the hands is segmented out from the depth image. In some embodiments, candidate blobs are detected by forming groups of pixels in close proximity to one another, and a classifier is applied to each blob. The classifier indicates whether the shape and other features of the blob correspond to a hand. (The classifier is trained offline on a large number of individual samples of hand blob data.) In some embodiments, hand blobs from previous frames are also considered, to indicate whether a blob corresponds to a hand. In some embodiments, the hand's contour is tracked from previous frames and matched to the contour of each blob from the current frame. Once the hand blob is found, all other pixels of the foreground are discarded.

Subsequently, at stage 820, features are detected in the segmented out depth image data and associated amplitude data and/or associated RGB images. These features may be, in some embodiments, the tips of the fingers, the points where the bases of the fingers meet the palm, and any other image data that is detectable. The features detected at stage 820 are then used to identify the individual fingers in the image data at stage 830.

At stage 840, the 3D points of the fingertips and some of the joints of the fingers may be used to construct a hand skeleton model. The skeleton model may be used to further improve the quality of the tracking and assign positions to joints which were not detected in the earlier stages, either because of occlusions, or missed features, or from parts of the hand being out of the camera's field-of-view. Moreover, a kinematic model may be applied as part of the skeleton, to add further information that improves the tracking results. U.S. patent application Ser. No. 13/768,835, entitled "Model-Based Multi-Hypothesis Target Tracker," filed Feb. 15, 2013, describes a system for tracking hand and finger configurations based on data captured by a depth camera, and is hereby incorporated in its entirety.

Figure 9:
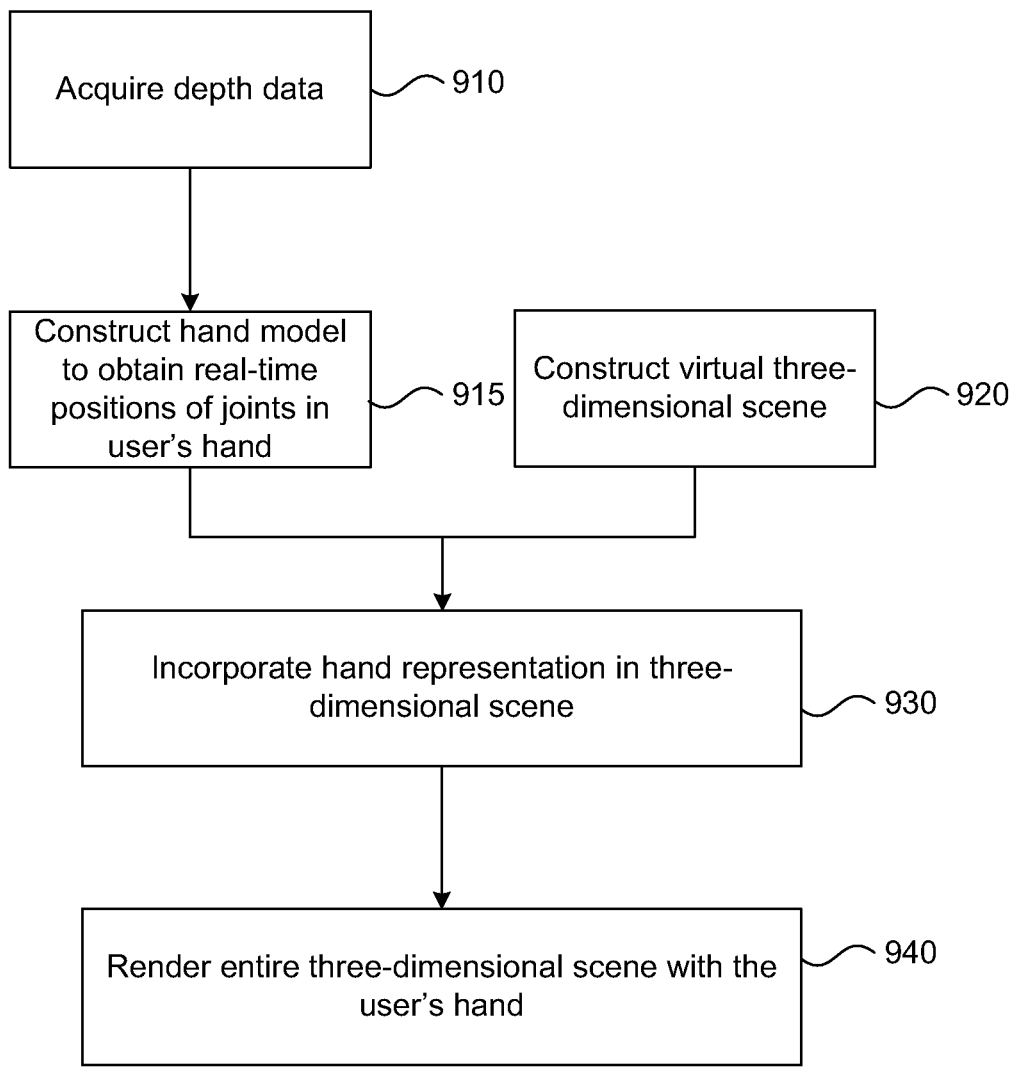
FIG. 9 is a workflow diagram showing an example process for displaying a hand within a three-dimensional scene.

Refer to FIG. 9, which is a workflow diagram showing an example process for displaying a hand within a 3D scene. At stage 910, a depth camera obtains depth data of the scene. Then at stage 915, a tracking module uses the depth data to construct a model or representation of the hand by processing the depth data stream to obtain real-time positions of all of the joints of the user's hand. In parallel, the virtual objects to be displayed to the user on the 3D display are constructed as a 3D scene at stage 920. Subsequently, at stage 930, the output of the tracking module, the 3D representation of the user's hand, is inserted into the constructed 3D scene.

Finally, at stage 940, the entire scene is rendered to produce the display graphics. With this technique, the user's hand is inserted into the virtual display, and the illusion of 3D is strengthened. Furthermore, in some embodiments, a physical simulation may be used such that if the user's hand collides with a virtual object, the virtual object is pushed aside, behaving as it would in the real world.

The user's hand may also be represented in various ways in the display, so as to orient the user as to the relative location of the hand with respect to the virtual environment and objects. In some embodiments, a silhouette of the user's hand (the hand "blob", as defined above) may be cropped from the depth data stream and rendered directly on the screen. In some embodiments, the hand may be represented as a graphical icon, such as a caricature of a hand. The user's hand may also be mapped to an icon with a different appearance, such as an arrow cursor, or a pointing object. Any of these (or other) hand representations may be modeled and rendered in 3D, to take advantage of the 3D display ability.

Figure 10:
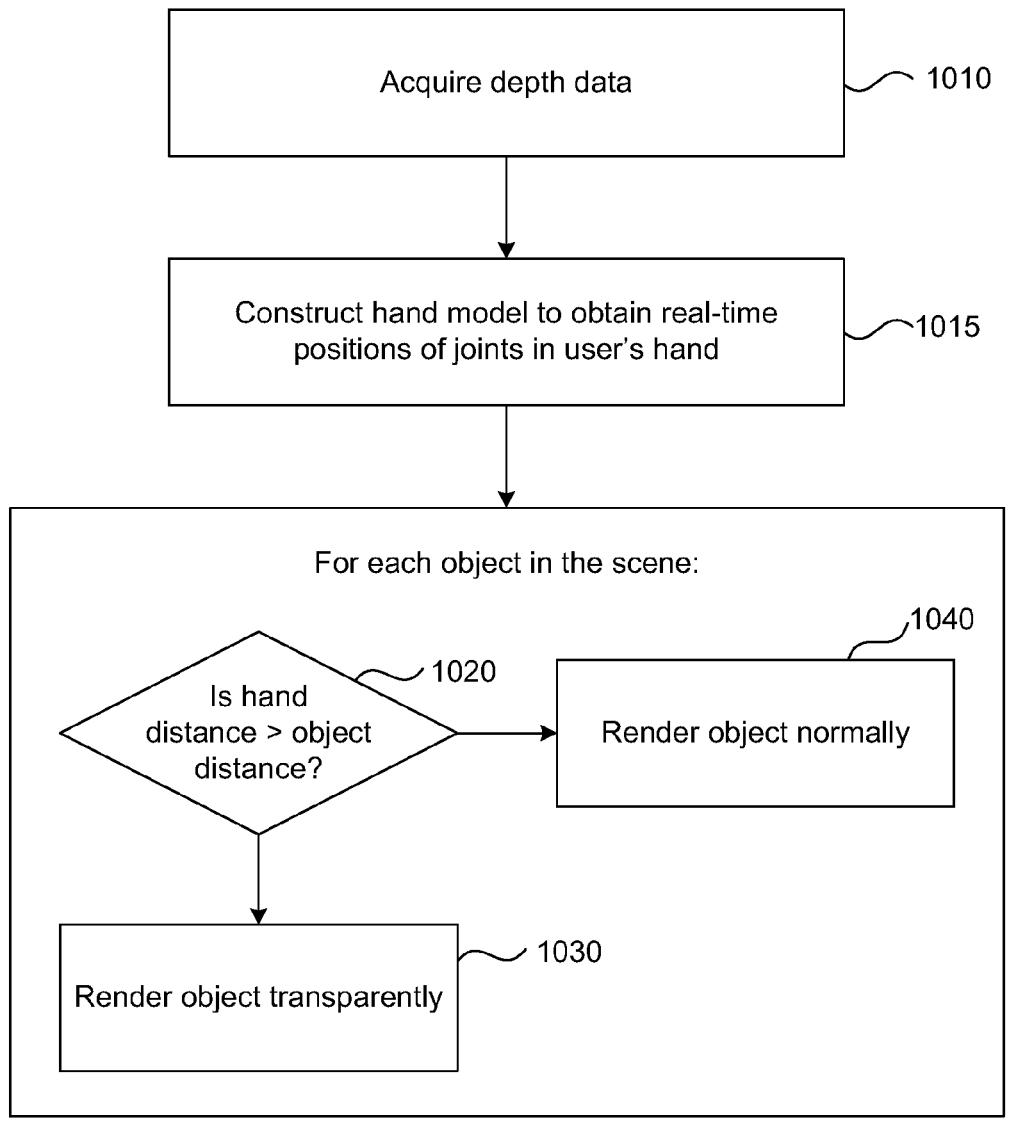
FIG. 10 is a workflow diagram illustrating an example process for using a hand to navigate through a three-dimensional interaction area.

In some embodiments, the user's hand may be moved perpendicularly, towards and away from the display screen, so as to select virtual objects at different depth levels. Depending on the distance of the user's hand from the physical display screen, virtual objects at corresponding depth levels are shown on the display. Refer to FIG. 10, which is a workflow diagram illustrating an example process for using a hand to navigate through a 3D interaction area.

The camera obtains depth data of a scene at stage 1010. Then at stage 1015, the depth data stream is processed, for example, by a tracking module, to construct a hand model that identifies the 3D positions of all of the joints of the user's hand.

Then, each virtual object in the scene to be rendered is tested as follows. At decision block 1020, the system determines if the distance between the user's hand and the physical screen is greater than the average virtual distance between the virtual object and the physical screen, that is, whether the object is closer to the screen than the user's hand as viewed by the user. If the object distance is less than the hand distance to the screen (stage 1020—Yes), at stage 1040, the object is rendered normally in the display. If the object is farther from the screen than the user's hand as viewed by the user (stage 1020—No), then at stage 1030, the object is rendered transparently. Transparent rendering of the object allows the user to see through the object.

At times, the user's hands may block the display screen from the user's view. In some embodiments, the user will be prompted to re-position the hands to the sides of the display screen, so that the hands do not occlude the display from the user's view. Then, when the 3D display presents objects to the user, the user does not actually reach out to touch the object (as would be with a touchscreen). Rather, the user moves his hands outside of the primary interaction space directly between the user and the display, while still staying within the field-of-view of the camera, so as to keep the primary interaction space free, and a cursor (or other representation of the user's hand) moves within the 3D display correspondingly. There may be a one-to-one mapping between the movements of the user's hands/fingers and those of the cursor on the display in the virtual interactive space.

In some embodiments, this method may be used to sort objects. For example, the user's hand is moved to the appropriate depth level to select an object of interest, such as a single page of a document while the user's hand is outside of the primary interaction space. The object may be selected by performing a pre-defined gesture, such as a pinch, or a grab. Once the object has been selected in this way, it moves responsive to the movements of the user's hand. The user may subsequently perform an additional gesture to release the object. Such a release gesture may be a pinch release, or a grab release. In this case, the user's hand movements are mapped to a virtual cursor that indicates which virtual object is selectable. Alternatively or additionally, the user can move a hand to the appropriate depth level to select an object of interest while within the primary interaction space, and the user's hand can be represented by a rendered hand inserted in the virtual scene displayed to the user in the three-dimensional display, as described in FIG. 9.

In particular, a pile of pages may be displayed in 3D to the user, with the top page front-facing the user. As the user's hand moves toward the physical screen, pages progressively become transparent, so that subsequent pages (those behind other pages) become visible. The user may notice a page of interest, select it with a pre-defined gesture, move the hand either backwards or forwards so that the page also moves, and then release the page (with the appropriate gesture) at a different point within the pile. In some embodiments, the user may select a "sub-pile" of pages from the pile, using an index finger and thumb to indicate the beginning and end of the sub-pile. Once the sub-pile is selected, the user may move the selected group of objects to different regions of the environment.

Objects that may be selected and manipulated in such a manner include collections of photos, books, songs, albums, and other types of media. In some embodiments, a web browser's history—that is, the collection of previous websites visited by a user—may be presented in this way, and the user may interact with the history pages accordingly.

A touch screen interaction experience may be extended to depth camera-based gesture control by defining a virtual "invisible wall" as a virtual touch screen that is a fixed distance in front of the physical display screen. If the user's fingers pass through or intersect the invisible wall, dots corresponding to relative locations of the fingertips are displayed on the screen. The user's fingers may then be re-positioned such that the user may interact with graphical elements according to accepted and familiar touch screen user interaction paradigms. In particular, the user may touch an element to launch an application, or change the distance between two fingers to indicate a zooming action ("in" or "out"), or to select an object.

The user is able to see the physical borders of a touch screen, and is therefore able to interact with it naturally. However, with the virtual touch screen simulated with an invisible wall, it may be difficult for the user to determine where the invisible wall begins. In some embodiments, the invisible wall is displayed in the 3D space in front of the 3D display screen, as a semi-transparent virtual wall. Providing the user with this visual cue enables a more natural interaction, since the user is then able to clearly understand how movements are interpreted by the application.

In some embodiments, a collection of pictures may be displayed to the user in 3D space. The user's hands may grab a picture, and move it around in space, in any of three dimensions, and finally releasing the picture when the movement of the picture is complete. The user may also place the picture behind other pictures, in which case the region of the picture occluded by other pictures may not be visible.

In some embodiments, movements of the hands and/or fingers may be used to change the depth-of-field of the scene displayed to the user. The depth-of-field of an image (either 2D or 3D) determines which parts of the image are in focus, and which parts are out-of-focus. In some embodiments, the user may position an open hand in front of the display screen, and then move fingers toward the palm. The (3D) distance between the fingertips and the center of the palm may be used to set the depth-of-field of the scene. In particular, as the user's fingers are moved toward the center of the palm, and the distance between the fingertips and the palm decreases, the depth-of-field is set to larger values. In some embodiments, the depth-of-field may be set according to the distance of the user's hand or other body part from the display screen, so the user may adjust the depth-of-field by moving a hand closer to and farther from the display screen.

In some embodiments, the 3D values of certain elements may be used to indicate how certain parameters are set, and the user may interact with the elements by pushing them toward the display screen, or pulling them away from the display screen with finger movements. The positions of the joints of the user's fingers are tracked by a tracking module relying on camera depth data. For example, an array of 3D buttons may be used to control a media player. One button may control the volume, another may control the balance, and another may control the treble. The extent to which each button projects out of the display screen into 3D space depends on the specific values of each parameter. The user may change the parameter values with hand movements by pushing buttons towards the display screen or pulling them away from the display screen.

There are different ways for the user to select an object. In some embodiments, the user can simply move the cursor over the object, and leave it there for some pre-determined amount of time. In some embodiments, the user can perform a gesture, such as a "grab" gesture, in which the user's performs finger movements toward the center of the hand, as if grabbing the virtual object. Similarly, the user can "de-select" an object, by performing a pre-determined gesture such as "release", in which the user's fingers are spread away from the palm. Alternatively, other specific gestures can be defined to accomplish these tasks ("select", "de-select"), as well.

In some embodiments, the described techniques may be combined with an additional tracking module that processes the data from a depth camera, or from an RGB camera, to track the location and orientation of the user's head. Then, the user can take advantage of the 3D display by with head movements to change the perspective of the user's view. For example, if an object is occluded by another object which is closer to the user as presented in the 3D display, the user may move his head to see around the occluding object.

Figure 11:
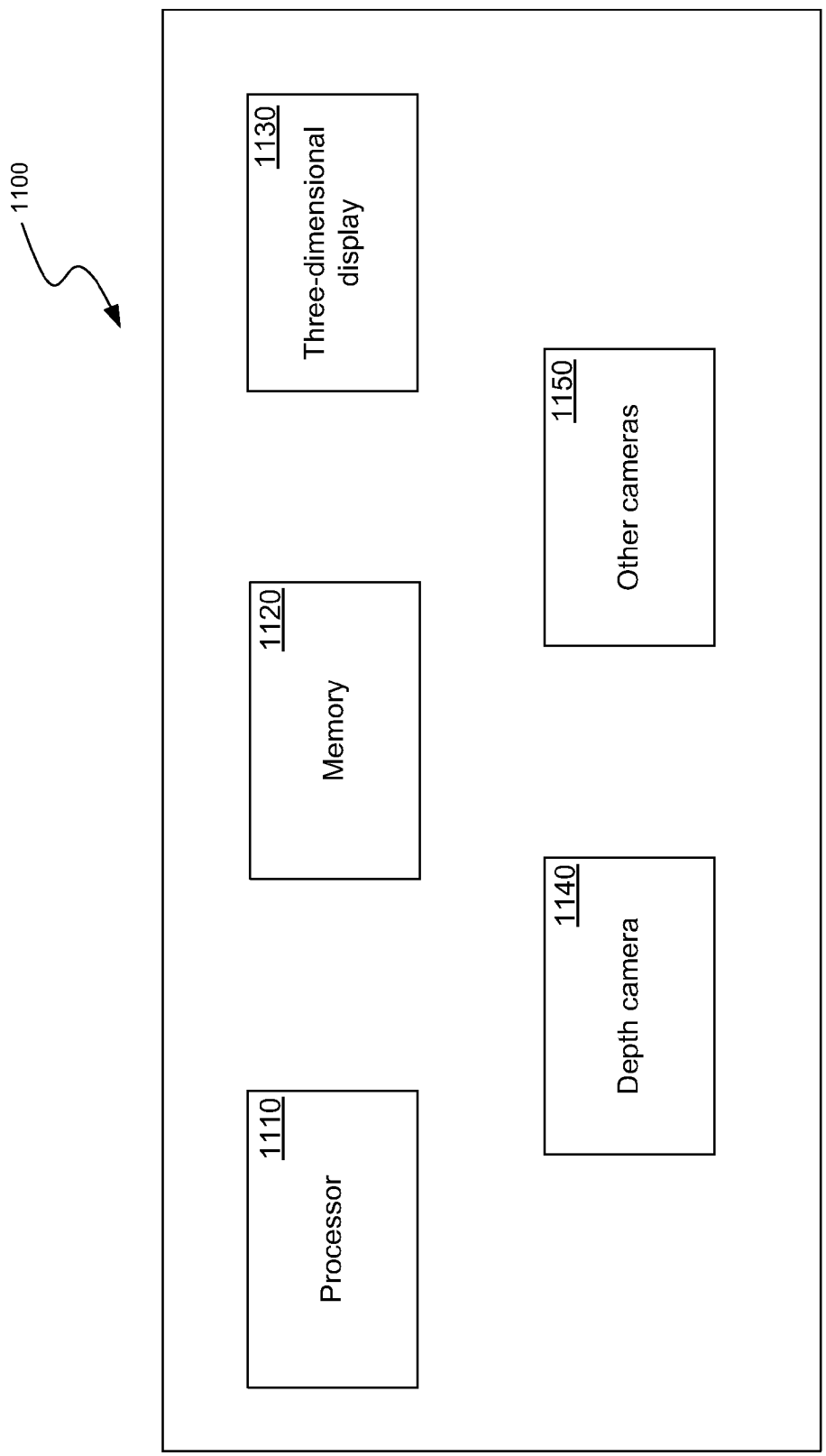
FIG. 11 is a block diagram of a system used to acquire depth data about user movements, interpret the depth data, and provide feedback of the user's movements with respect to virtual objects in a three-dimensional display

FIG. 11 shows a block diagram 1100 of a system used to acquire depth data about user movements, interpret the depth data, and provide feedback of the user's movements with respect to virtual objects in a three-dimensional display. The system may include one or more processors 1110, memory units 1120, three-dimensional display 1130, depth camera 1140, and, optionally, other camera(s) 1150.

A depth camera 1140 captures a sequence of depth images of a subject or one or more portions of the subject's body, such as one or both hands and/or the head. The other camera(s) 1150 can also capture a sequence of images of the subject or one or more portions of the subject's body, but the camera may be a different type of camera, such as a two-dimensional camera, and RGB camera, and/or infrared camera.

A processor 1110 may be used to run algorithms for processing the data acquired by the depth camera 1140 and any other camera 1150. The processor 1210 can also provide feedback to the user, for example on the three-dimensional display 1130. Memory 1120 may include but is not limited to, RAM, ROM, and any combination of volatile and non-volatile memory.

Figure 12:
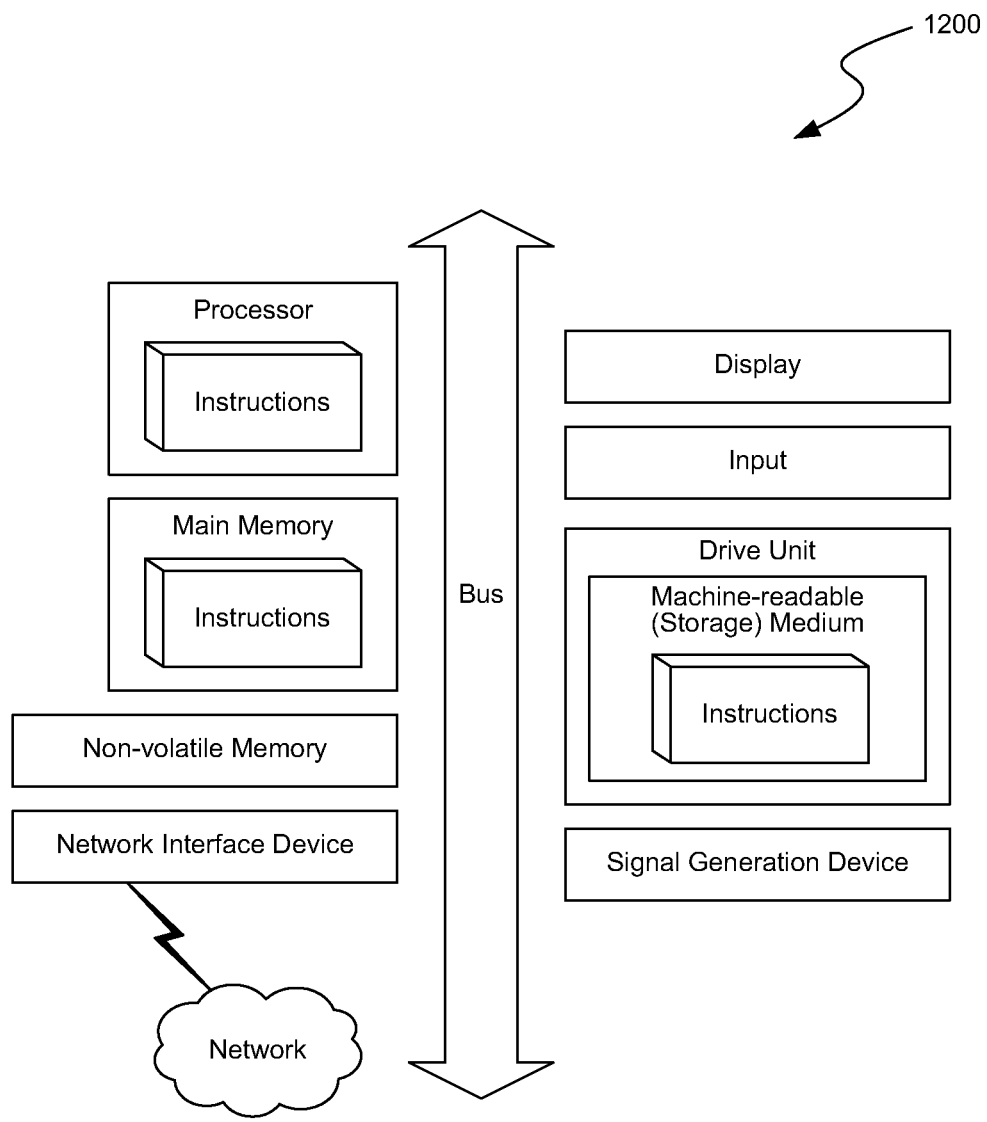
FIG. 12 is a block diagram showing an example of the architecture for a processing system that can be utilized to implement tracking techniques according to an embodiment of the present disclosure.

FIG. 12 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference in their entireties. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

What is claimed is:

1. A method comprising:
    acquiring depth data of a subject with a depth sensor, including acquiring depth data of at least one of the subject's hands;
    tracking the subject's movements using the acquired depth data, including:
        applying a classifier to the acquired depth data to segment a group of pixels corresponding to the subject from the acquired depth data to form segmented depth data;
        identifying a plurality of features of the subject in segmented depth data;
        obtaining three-dimensional positions corresponding to the identified plurality of features from segmented depth data; and
        constructing a three-dimensional model of the plurality of features from the three-dimensional positions;
    constructing a three-dimensional scene including a plurality of virtual objects;
    inserting the three-dimensional model into the three-dimensional scene;
    determining whether a distance between the subject and a screen is greater than a an average virtual distance between a virtual object and the screen;
    causing to be displayed in a three-dimensional display the subject's movements interacting with the virtual object in the three-dimensional scene upon a determination that the distance between the subject and the screen is greater than an average virtual distance between a virtual object and the screen; and
    using the acquired depth data of the at least one of the subject's hands, dynamically rendering a topmost one of the plurality of virtual objects caused to be displayed in the three-dimensional display to be progressively transparent in proportion to a distance between the at least one of the subject's hands and the screen as the at least one hand moves closer to the screen and progressively visible as the at least one hand moves away from the screen, wherein the progressively transparent topmost virtual object reveals other visible objects of the plurality of virtual objects previously obscured by the topmost one of the plurality of virtual objects before becoming progressively transparent.

2. The method of claim 1, wherein movements of the at least one of the subject's hands are mapped to a first virtual object, and corresponding movements of the first virtual object are shown in the three-dimensional display.

3. The method of claim 1, further comprising causing to be displayed in the three-dimensional display a second virtual object, wherein the subject interacts with the second virtual object through the subject's movements, and further wherein interaction of the subject with the second virtual object permits the subject to interact with an electronic device.

4. The method of claim 3, wherein at least some of the subject's movements occlude the second virtual object in the three-dimensional display.

5. The method of claim 1, wherein tracking the subject's movements further comprises classifying the subject's movements by qualitatively comparing the subject's movements to known gestures.

6. The method of claim 1, wherein the identified plurality of features are a plurality of joints of the subject's hand.

7. The method of claim 1, wherein the three-dimensional display is generated by stereoscopy.

8. The method of claim 1, wherein the three-dimensional display is generated by holography.

9. The method of claim 1, wherein the three-dimensional display is a head-mounted display.

10. The method of claim 1, further comprising causing to be displayed a semi-transparent wall in front of a screen of the three-dimensional display, wherein when portions of the subject's body intersect the wall, indications of relative locations of intersections with the wall are caused to be displayed.

11. The method of claim 1, further comprising changing a depth of field of the three-dimensional display based on a distance of a tracked body part of the subject from a screen of the three-dimensional display.

12. The method of claim 1, further comprising changing a depth of field of the three-dimensional display based on a distance between fingertips of a tracked hand of the subject from a palm of the hand.

13. The method of claim 1, wherein dynamically rendering the topmost one of the plurality of virtual objects caused to be displayed in the three-dimensional display to be progressively transparent or progressively visible, includes dynamically rendering a virtual object to be progressively transparent when an average virtual distance between the virtual object and a screen of the three-dimensional display increases to greater than a distance between a hand of the subject and the screen, and further includes dynamically rendering a virtual object to be progressively visible when the average virtual distance between the virtual object and the screen of the three-dimensional display decreases to less than the distance between the hand of the subject and the screen.

14. The method of claim 1, further comprising causing to be displayed a user interface element as a projection from a screen of the three-dimensional display toward the subject, wherein a perceived distance of the projection of the user interface element is set based on a value of a parameter associated with the user interface element.

15. The method of claim 14, wherein when the subject's movement corresponds to pushing the user interface element, the parameter associated with the user interface element is changed in a first direction, and when the subject's movement corresponds to pulling the user interface element, the parameter associated with the user interface element is changed in an opposite direction.

16. A system comprising:
a sensing module configured to acquire a sequence of depth images of one or more body parts of a subject; a processor to implement a tracking module configured to track movements of the one or more body parts in the sequence of depth images, including applying a classifier to the acquired depth data to segment a group of pixels corresponding to the subject from the acquired depth data to form segmented depth data, identifying a plurality of features of the subject in segmented depth data, obtaining three-dimensional positions corresponding to the identified plurality of features from segmented depth data and constructing a three-dimensional model of the plurality of features from the three-dimensional positions, constructing a three-dimensional scene including a plurality of virtual objects, and inserting the three-dimensional model into the three-dimensional scene and determine whether a distance between the subject and a screen is greater than a an average virtual distance between a virtual object and the screen;
a display configured to provide feedback images perceived as three-dimensional to the subject, wherein the feedback images include a first virtual object animated with movements corresponding to the tracked movements of the one or more body parts, and further wherein the feedback images include a second virtual object with which the subject can interact upon a determination that the distance between the subject and the screen is greater than an average virtual distance between a virtual object and the screen; and
upon a determination that the distance between the subject and the screen is decreasing, dynamically rendering the second virtual object with which the subject can interact progressively visible, and upon a determination that the distance between the subject and the screen is increasing, dynamically rendering the second virtual object with which the subject can interact progressively transparent.

17. The system of claim 16, wherein the feedback images comprise a user interface configured to allow the subject to control an electronic device based upon interactions of the subject with the second virtual object.

18. The system of claim 16, wherein the one or more body parts is a hand and fingers of the hand, and wherein tracking movements of the hand and fingers comprises identifying features of the hand and fingers in the depth images; obtaining three-dimensional positions corresponding to the identified features; and constructing a model from the three-dimensional positions.

19. A non-transitory computer readable medium having instructions which, when executed by a processor, cause the processor to perform operations comprising:
acquiring depth data of a subject with a depth sensor;
tracking the subject's movements using the acquired depth data, including:
applying a classifier to the acquired depth data to segment a group of pixels corresponding to the subject from the acquired depth data to form segmented depth data;
identifying a plurality of features of the subject in segmented depth data;
obtaining three-dimensional positions corresponding to the identified plurality of features from segmented depth data; and
constructing a three-dimensional model of the plurality of features from the three-dimensional positions;
constructing a three-dimensional scene including a plurality of virtual objects;
inserting the three-dimensional model into the three-dimensional scene;
determining whether a distance between the subject and a screen is greater than a an average virtual distance between a virtual object and the screen;
causing to be displayed in a three-dimensional display the subject's movements interacting with the virtual object in the three-dimensional scene upon a determination that the distance between the subject and the screen is greater than an average virtual distance between a virtual object and the screen; and using the acquired depth data of the at least one of the subject's hands, dynamically rendering a topmost one of the plurality of virtual objects caused to be displayed in the three-dimensional display to be progressively transparent in proportion to a distance between the at least one of the subject's hands and the screen as the at least one hand moves closer to the screen and progressively visible as the at least one hand moves away from the screen, wherein the progressively transparent topmost virtual object reveals other visible objects of the plurality of virtual objects previously obscured by the topmost one of the plurality of virtual objects before becoming progressively transparent.

* * * * *

UNITED STATES PATENT AND TRADEMARK OFFICE
CERTIFICATE OF CORRECTION

PATENT NO. : 9,477,303 B2  
APPLICATION NO. : 13/857009  
DATED : October 25, 2016  
INVENTOR(S) : Fleishman et al.

Page 1 of 1

It is certified that error appears in the above-identified patent and that said Letters Patent is hereby corrected as shown below:

On the Title Page

At (72) Inventors: delete "Shahar Fleischmann, Hod Hasharon (IL)" and insert --Shahar Fleishman, Hod Hasharon (IL)--.

Signed and Sealed this  
Fourteenth Day of February, 2017

Michelle K. Lee  
*Director of the United States Patent and Trademark Office*